United States Patent
Gross et al.

(10) Patent No.: US 11,407,675 B2
(45) Date of Patent: Aug. 9, 2022

(54) GLASSES HAVING RESISTANCE TO PHOTO-DARKENING

(71) Applicant: CORNING INCORPORATED, Corning, NY (US)

(72) Inventors: Timothy Michael Gross, Corning, NY (US); Xiaoju Guo, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 661 days.

(21) Appl. No.: 16/320,277

(22) PCT Filed: Jul. 21, 2017

(86) PCT No.: PCT/US2017/043293
§ 371 (c)(1),
(2) Date: Jan. 24, 2019

(87) PCT Pub. No.: WO2018/022453
PCT Pub. Date: Feb. 1, 2018

(65) Prior Publication Data
US 2019/0270666 A1 Sep. 5, 2019

Related U.S. Application Data

(60) Provisional application No. 62/367,900, filed on Jul. 28, 2016.

(51) Int. Cl.
C03C 3/097 (2006.01)
C03C 4/02 (2006.01)
C03C 4/00 (2006.01)

(52) U.S. Cl.
CPC ............ C03C 3/097 (2013.01); C03C 4/0092 (2013.01); C03C 4/02 (2013.01); C03C 2204/00 (2013.01)

(58) Field of Classification Search
CPC ......... C03C 3/091; C03C 3/093; C03C 3/097; C03C 4/02; C03C 4/0092
See application file for complete search history.

(56) References Cited

U.S. PATENT DOCUMENTS

| 7,598,192 | B2 | 10/2009 | Wolff et al. |
| 7,666,511 | B2 | 2/2010 | Ellison et al. |
| 7,977,262 | B2 | 7/2011 | Motoya et al. |
| 8,283,269 | B2 | 10/2012 | Fechner et al. |
| 8,586,492 | B2 | 11/2013 | Barefoot et al. |
| 8,765,262 | B2 | 7/2014 | Gross |
| 9,156,724 | B2 | 10/2015 | Gross |
| 9,290,407 | B2 | 3/2016 | Barefoot et al. |
| 9,346,703 | B2 | 5/2016 | Bookbinder et al. |
| 9,517,967 | B2 | 12/2016 | Dejneka et al. |
| 9,969,644 | B2 | 5/2018 | Gross et al. |
| 2008/0286548 | A1* | 11/2008 | Ellison ............... C03C 3/087 428/220 |
| 2011/0265863 | A1 | 11/2011 | Nagashima et al. |
| 2014/0170380 | A1 | 6/2014 | Murata et al. |
| 2014/0308525 | A1* | 10/2014 | Hochrein ............. C03C 4/18 428/410 |
| 2015/0314571 | A1 | 11/2015 | Cites et al. |
| 2016/0090321 | A1 | 3/2016 | Bookbinder et al. |

FOREIGN PATENT DOCUMENTS

| CN | 101679106 A | 3/2010 |
| CN | 103476724 A | 12/2013 |
| CN | 104098269 A | 10/2014 |
| CN | 104114503 A | 10/2014 |
| JP | 06-016453 A | 1/1994 |
| JP | 06016453 A * | 1/1994 ............ C03C 3/11 |
| JP | 2004315279 A | 11/2004 |
| JP | 2006089342 A | 4/2006 |
| JP | 2007210851 A | 8/2007 |
| JP | 2010105897 A | 5/2010 |
| JP | 2010-527892 A | 8/2010 |
| JP | 2010184816 A | 8/2010 |
| JP | 2011-057547 A | 3/2011 |
| JP | 2011057547 A * | 3/2011 |
| JP | 2011-249779 A | 12/2011 |
| JP | 2013151402 A | 8/2013 |
| JP | 2016-000667 A | 1/2016 |
| WO | 2008/143999 A1 | 11/2008 |
| WO | 2016049400 A1 | 3/2016 |
| WO | 2017038621 A1 | 3/2017 |

OTHER PUBLICATIONS

Chinese Patent Application No. 201780046710.X, Office Action dated Jun. 22, 2021, 12 pages (5 pages of English Translation and 7 pages of Original Document), Chinese Patent Office.
Japanese Patent Application No. 2019-504139, Office Action dated May 26, 2021, 5 pages (English Translation Only), Japanese Patent Office.
Ebeling et al; "Influence of Modifier Cations on the Radiation-Induced Effects of Metaphosphate Glasses"; Glass Sci. Technol.; 76 No. 2 (2003) pp. 56-61.

(Continued)

Primary Examiner — Elizabeth A. Bolden

(57) ABSTRACT

Glass articles that are resistant to coloration when exposed to ultraviolet light or plasma cleaning processes. The glass articles comprise or consist of an alkali aluminosilicate glass containing from about 0.1 mol % to about 1 mol % of at least one of $ZrO_2$, $Sb_2O_3$, and $Nb_2O_5$; and less than about 400 ppm each of oxides of titanium, iron, germanium, cerium, nickel, cobalt, and europium.

16 Claims, 3 Drawing Sheets

(56) References Cited

OTHER PUBLICATIONS

International Search Report and Written Opinion of the International Searching Aurthority; PCT/US2017/043293; dated Oct. 13, 2017; 12 Pages; European Patent Office.

Moncke et al; "Radiation-Induced Defects In CoO- And NiO-Doped Fluoride, Phosphate, Silicate and Borosilicate Glasses"; Glass Sci. Technol.; 75 No. 5 (2002) pp. 243-253.

Moncke et al; "UV Light Induced Photoreduction in Phosphate and Fluoride-Phosphate Glasses Doped With Ni2+, Ta5+, Pb2+, and Ag+ Compounds"; Glass Sci. Technol.; 77 No. 5 (2004) pp. 239-248.

\* cited by examiner

GLASSES HAVING RESISTANCE TO PHOTO-DARKENING

CROSS-REFERENCE TO RELATED APPLICATIONS

This application is a national stage entry of International Patent Application Serial No. PCT/US2017/043293 filed on Jul. 21, 2017, which claims the benefit of priority of U.S. Provisional Application Ser. No. 62/367,900 filed on Jul. 28, 2016 the content of which is relied upon and incorporated herein by reference in its entirety.

BACKGROUND

The disclosure relates to glass articles comprising glasses that are resistant to photo-darkening. More particularly, the disclosure relates to glass articles comprising glasses that are resistant to photo-darkening caused by exposure to ultraviolet radiation or plasma.

Glasses that are used in consumer electronics, pharmaceutical, architectural, and automotive applications are often subjected to ultraviolet (UV) light and/or plasma cleaning processes prior to final use. Such processes frequently cause the glass to discolor. Alkali aluminosilicate glasses, for example, turn yellow and/or pink when exposed to UV light or plasma cleaning processes.

Multivalent ions of metals such as Ti, Fe, Mn, Ge, Sn, Ce, Ni, Co, Eu, and the like are sometimes included in the glass to provide a UV cutoff, thus blocking the UV wavelengths that cause coloration. However, the addition of these multivalent ions adds some color to the glass prior to exposure.

Thermal and optical bleaching do not provide acceptable solutions for reducing coloration due to radiation exposure. Thermal bleaching and optical bleaching are normally effective in removing the color resulting from UV radiation exposure. New UV and plasma cleaning processes take place after the glass is ion exchanged. Such post-ion exchange heat treatments change the stress profile in the ion-exchanged glass and are therefore unacceptable. Optical bleaching reduces coloration caused by UV radiation exposure, but requires an extra process and is time consuming.

SUMMARY

Glass articles that are resistant to coloration when exposed to ultraviolet light or plasma cleaning processes are provided. The glass articles comprise or consist of an alkali aluminosilicate glass containing from about 0.1 mol % to about 1 mol % of at least one of $ZrO_2$, $Sb_2O_3$ and $Nb_2O_5$, and less than about 400 ppm each of oxides of titanium, iron, germanium, cerium, nickel, cobalt, and europium.

Accordingly, one aspect of the disclosure is to provide a glass article comprising an alkali aluminosilicate glass. The alkali aluminosilicate glass comprises: at least about 50 mol % $SiO_2$; from about 9 mol % to about 22 mol % $Al_2O_3$; at least one of $B_2O_3$ and $P_2O_5$, wherein 0.1 mol %≤$B_2O_3$(mol %)+$P_2O_5$(mol %)≤19 mol %; from about 8 mol % to about 16 mol % $Na_2O$; from about 0.1 mol % to about 1 mol % of at least one of $ZrO_2$, $Sb_2O_3$, and $Nb_2O_5$; and less than about 400 ppm each of oxides of titanium, iron, germanium, cerium, nickel, cobalt, and europium. The alkali aluminosilicate glass has color coordinates L*≥96.10, |a*|≤0.60, and |b*|≤0.80.

A second aspect of the disclosure is to provide a glass article comprising an alkali aluminosilicate glass. The alkali aluminosilicate glass comprises: at least about 50 mol % $SiO_2$; from about 9 mol % to about 22 mol % $Al_2O_3$; at least one of $B_2O_3$ and $P_2O_5$, wherein 0.1 mol %≤$B_2O_3$(mol %)+$P_2O_5$(mol %)≤19 mol %; from about 8 mol % to about 16 mol % $Na_2O$; and from about 0.1 mol % to about 1 mol % $ZrO_2$; and less than about 400 ppm each of oxides of titanium, iron, germanium, cerium, nickel, cobalt, and europium. The alkali aluminosilicate glass has color coordinates L*≥96.10, |a*|≤0.59, and |b*|≤0.77.

In a third aspect, a glass article comprising an alkali aluminosilicate glass is provided. The alkali aluminosilicate glass comprises: at least about 50 mol % $SiO_2$; from about 9 mol % to about 22 mol % $Al_2O_3$; at least one of $B_2O_3$ and $P_2O_5$, wherein 0.1 mol %≤$B_2O_3$(mol %)+$P_2O_5$(mol %)≤19 mol %; from about 8 mol % to about 16 mol % $Na_2O$; from about 0.1 mol % to about 1 mol % $Nb_2O_5$; and less than about 400 ppm of each of $Sb_2O_3$ and $ZrO_2$ and has color coordinates L*≥96.65, |a*|≤0.07, and |b*|≤0.30.

According to embodiment (1), a glass article comprising an alkali aluminosilicate glass is provided. The alkali aluminosilicate glass comprises: at least about 50 mol % $SiO_2$; from about 9 mol % to about 22 mol % $Al_2O_3$; at least one of $B_2O_3$ and $P_2O_5$, wherein 0.1 mol %≤$B_2O_3$(mol %)+$P_2O_5$(mol %)≤19 mol %; from about 8 mol % to about 16 mol % $Na_2O$; from about 0.1 mol % to about 1 mol % of at least one of $ZrO_2$, $Sb_2O_3$, and $Nb_2O_5$; and less than about 400 ppm each of oxides of titanium, iron, germanium, cerium, nickel, cobalt, and europium. The alkali aluminosilicate glass has color coordinates L*≥96.10, |a*|≤0.60, and |b*|≤0.80.

According to embodiment (2), the glass article of embodiment (1) is provided wherein the alkali aluminosilicate glass has color coordinates L*≥96.70, |a*|≤0.03, and |b*|≤0.22.

According to embodiment (3), the glass article of embodiment (1) or (2) is provided wherein the alkali aluminosilicate glass comprises from about 0.1 mol % to about 1 mol % $ZrO_2$ and less than about 400 ppm each of $Sb_2O_3$, and $Nb_2O_5$ and has color coordinates L*≥96.10, |a*|≤0.59, and |b*|≤0.77.

According to embodiment (4), the glass article of embodiment (3) is provided wherein the alkali aluminosilicate glass has color coordinates L*≥96.71, |a*|≤0.01, and |b*|≤0.16.

According to embodiment (5), the glass article of embodiment (3) is provided wherein the alkali aluminosilicate glass further comprises from about 0.5 mol % to about 2 mol % ZnO and has color coordinates L*≥96.41, |a*|≤0.28, and |b*|≤0.52.

According to embodiment (6), the glass article of embodiment (5) is provided wherein the alkali aluminosilicate glass has color coordinates L*≥96.73, |a*|≤0.01, and |b*|≤0.16.

According to embodiment (7), the glass article of embodiment (1) or (2) is provided wherein the alkali aluminosilicate glass comprises from about 0.1 mol % to about 1 mol % $Nb_2O_5$ and less than about 400 ppm each of $Sb_2O_3$ and $ZrO_2$ and has color coordinates L*≥96.65, |a*|≤0.07, and |b*|≤0.30.

According to embodiment (8), the glass article of embodiment (7) is provided wherein the alkali aluminosilicate glass has color coordinates L*≥96.80, |a*|≤0.03, and |b*|≤0.22.

According to embodiment (9), the glass article of embodiment (1) or (2) is provided wherein the alkali aluminosilicate glass comprises from about 0.1 mol % to about 1 mol % $Sb_2O_3$ and less than about 400 ppm each of, $ZrO_2$ and $Nb_2O_5$.

According to embodiment (10), the glass article of any of embodiments (1) to (9) is provided wherein the alkali aluminosilicate glass comprises at least about 4 mol % $P_2O_5$, wherein 1.3<[($P_2O_5$+$R_2O$)/$M_2O_3$]≤2.3, wherein $M_2O_3=Al_2O_3+B_2O_3$, and wherein $R_2O$ is the sum of monovalent cation oxides present in the alkali aluminosilicate glass.

According to embodiment (11), the glass article of any of embodiments (1) to (10) is provided wherein the alkali aluminosilicate glass comprises: at least about 50 mol % $SiO_2$; from 16 mol % to about 28 mol % $Al_2O_3$; at least about 4 mol % $P_2O_5$; and at least one alkali metal oxide ($R_2O$) selected from the group consisting of $Na_2O$ and $K_2O$, wherein $0.75 \leq [(P_2O_5(\text{mol \%})+R_2O(\text{mol \%}))/M_2O_3 \text{ (mol \%)}] \leq 1.3$, where $M_2O_3=Al_2O_3+B_2O_3$.

According to embodiment (12), the glass article of any of embodiments (1) to (11) is provided wherein the alkali aluminosilicate glass comprises: at least about 50 mol % $SiO_2$; at least about 10 mol % $R_2O$, wherein $R_2O$ comprises at least about 10 mol % $Na_2O$; from 12 mol % to about 22 mol % $Al_2O_3$, wherein $-1.6$ mol % $\leq Al_2O_3(\text{mol \%})-R_2O(\text{mol \%}) \leq 2$ mol %; and from greater than 0 mol % to 5 mol % $B_2O_3$, wherein $B_2O_3(\text{mol \%})-(R_2O(\text{mol \%})-Al_2O_3(\text{mol \%})) \geq 4.5$ mol %.

According to embodiment (13), the glass article of any of embodiments (1) to (12) is provided wherein the alkali aluminosilicate glass has a coefficient of thermal expansion of at least about $90 \times 10^{-7} \, °C.^{-1}$ and comprises: from about 57 mol % to about 75 mol % $SiO_2$; from about 6 mol % to about 17 mol % $Al_2O_3$; from about 2 mol % to about 7 mol % $P_2O_5$; from about 14 mol % to about 17 mol % $Na_2O$; and from greater than about 1 mol % to about 5 mol % $K_2O$.

According to embodiment (14), the glass article of any of embodiments (1) to (13) is provided wherein the alkali aluminosilicate glass is fusion formable.

According to embodiment (15), the glass article of any of embodiments (1) to (14) is provided wherein the glass article forms at least a portion of a cover glass for a consumer electronic device, the consumer electronic device comprising a housing; electrical components provided at least partially internal to the housing, the electrical components including at least a controller, a memory, and a display, the display being provided at or adjacent to a front surface of the housing; wherein the cover glass is provided at or over the front surface of the housing and over the display.

According to embodiment (16), the glass article of any of embodiments (1) to (15) is provided wherein the glass article forms at least a portion of a pharmaceutical vial, an automotive glass panel, or an architectural glass panel.

According to embodiment (17) a glass article comprising an alkali aluminosilicate glass is provided. The alkali aluminosilicate glass comprises: at least about 50 mol % $SiO_2$; from about 9 mol % to about 22 mol % $Al_2O_3$; at least one of $B_2O_3$ and $P_2O_5$, wherein $0.1$ mol % $\leq B_2O_3(\text{mol \%})+P_2O_5(\text{mol \%}) \leq 19$ mol %; from about 8 mol % to about 16 mol % $Na_2O$; and from about 0.1 mol % to about 2 mol % $ZrO_2$. The alkali aluminosilicate glass has color coordinates $L^* \geq 96.10$, $|a^*| \leq 0.59$, and $|b^*| \leq 0.77$.

According to embodiment (18), the glass article of embodiment (17) is provided wherein the alkali aluminosilicate glass has color coordinates $L^* \geq 96.71$, $|a^*| \leq 0.01$, and $|b^*| \leq 0.16$.

According to embodiment (19), the glass article of embodiment (17) is provided wherein the alkali aluminosilicate glass further comprises from about 0.5 mol % to about 2 mol % ZnO and has color coordinates $L^* \geq 96.41$, $|a^*| \leq 0.28$, and $|b^*| \leq 0.52$.

According to embodiment (20), the glass article of embodiment (19) is provided wherein the alkali aluminosilicate glass has color coordinates $L^* \geq 96.73$, $|a^*| < 0.01$, and $|b^*| \leq 0.16$.

According to embodiment (21), the glass article of any of embodiments (17) to (20) is provided wherein the alkali aluminosilicate glass comprises at least about 4 mol % $P_2O_5$, wherein $1.3 < [(P_2O_5+R_2O)/M_2O_3] \leq 2.3$, wherein $M_2O_3=Al_2O_3+B_2O_3$, and wherein $R_2O$ is the sum of monovalent cation oxides present in the alkali aluminosilicate glass.

According to embodiment (22), the glass article of any of embodiments (17) to (20) is provided wherein the alkali aluminosilicate glass comprises: at least about 50 mol % $SiO_2$; from 16 mol % to about 28 mol % $Al_2O_3$; at least about 4 mol % $P_2O_5$; and at least one alkali metal oxide ($R_2O$) selected from the group consisting of $Na_2O$ and $K_2O$, wherein $0.75 \leq [(P_2O_5(\text{mol \%})+R_2O(\text{mol \%}))/M_2O_3 \text{ (mol \%)}] \leq 1.3$, where $M_2O_3=Al_2O_3+B_2O_3$.

According to embodiment (23), the glass article of any of embodiments (17) to (20) is provided wherein the alkali aluminosilicate glass comprises: at least about 50 mol % $SiO_2$; at least about 10 mol % alkali metal oxides ($R_2O$), wherein $R_2O$ comprises at least about 10 mol % $Na_2O$; from 12 mol % to about 22 mol % $Al_2O_3$, wherein $-1.6$ mol % $\leq Al_2O_3(\text{mol \%})-R_2O(\text{mol \%}) \leq 2$ mol %; and from greater than 0 mol % to 5 mol % $B_2O_3$, wherein $B_2O_3(\text{mol \%})-(R_2O(\text{mol \%})-Al_2O_3(\text{mol \%})) \geq 4.5$ mol %.

According to embodiment (24), the glass article of any of embodiments (17) to (20) is provided wherein the alkali aluminosilicate glass has a coefficient of thermal expansion of at least about $90 \times 10^{-7} \, °C.^{-1}$ and comprises: from about 57 mol % to about 75 mol % $SiO_2$; from about 6 mol % to about 17 mol % $Al_2O_3$; from about 2 mol % to about 7 mol % $P_2O_5$; from about 14 mol % to about 17 mol % $Na_2O$; and from greater than about 1 mol % to about 5 mol % $K_2O$.

According to embodiment (25), the glass article of any of embodiments (17) to (24) is provided wherein the alkali aluminosilicate glass is fusion formable.

According to embodiment (26), the glass article of any of embodiments (17) to (25) is provided wherein the glass article forms at least a portion of a cover glass for a consumer electronic device, the consumer electronic device comprising a housing; electrical components provided at least partially internal to the housing, the electrical components including at least a controller, a memory, and a display, the display being provided at or adjacent to a front surface of the housing; wherein the cover glass is provided at or over the front surface of the housing and over the display.

According to embodiment (27), the glass article of any of embodiments (17) to (26) is provided wherein the glass article forms at least a portion of a pharmaceutical vial, an automotive glass panel, or an architectural glass panel.

According to embodiment (28) a glass article comprising an alkali aluminosilicate glass is provided. The alkali aluminosilicate glass comprises: at least about 50 mol % $SiO_2$; from about 9 mol % to about 22 mol % $Al_2O_3$; at least one of $B_2O_3$ and $P_2O_5$, wherein $0.1$ mol % $\leq B_2O_3(\text{mol \%})+P_2O_5(\text{mol \%}) \leq 19$ mol %; from about 8 mol % to about 16 mol % $Na_2O$; and from about 0.1 mol % to about 1 mol % $Nb_2O_5$ and less than about 400 ppm each of $Sb_2O_3$ and $ZrO_2$ and has color coordinates $L^* \geq 96.65$, $|a^*| \leq 0.07$, and $|b^*| \leq 0.30$.

According to embodiment (29), the glass article of embodiment (28) is provided wherein the alkali aluminosilicate glass has color coordinates $L^* \geq 96.80$, $|a^*| \leq 0.03$, and $|b^*| \leq 0.22$.

According to embodiment (30), the glass article of embodiment (28) or (29) is provided wherein the alkali aluminosilicate glass comprises at least about 4 mol % $P_2O_5$, wherein $1.3 < [(P_2O_5+R_2O)/M_2O_3] \leq 2.3$, wherein $M_2O_3=Al_2O_3+B_2O_3$, and wherein $R_2O$ is the sum of monovalent cation oxides present in the alkali aluminosilicate glass.

According to embodiment (31), the glass article of embodiment (28) or (29) is provided wherein the alkali aluminosilicate glass comprises: at least about 50 mol % $SiO_2$; from 16 mol % to about 28 mol % $Al_2O_3$; at least about 4 mol % $P_2O_5$; and at least one alkali metal oxide ($R_2O$) selected from the group consisting of $Na_2O$ and $K_2O$, wherein $0.75 \leq [(P_2O_5(\text{mol \%})+R_2O(\text{mol \%}))/M_2O_3 (\text{mol \%})] \leq 1.3$, where $M_2O_3=Al_2O_3+B_2O_3$.

According to embodiment (32), the glass article of embodiment (28) or (29) is provided wherein the alkali aluminosilicate glass comprises: at least about 50 mol % $SiO_2$; at least about 10 mol % alkali metal oxides ($R_2O$), wherein $R_2O$ comprises at least about 10 mol % $Na_2O$; from 12 mol % to about 22 mol % $Al_2O_3$, wherein $-1.6$ mol % $\leq Al_2O_3(\text{mol \%})-R_2O(\text{mol \%}) \leq 2$ mol %; and from greater than 0 mol % to 5 mol % $B_2O_3$, wherein $B_2O_3(\text{mol \%})-(R_2O(\text{mol \%})-Al_2O_3(\text{mol \%})) \geq 4.5$ mol %.

According to embodiment (33), the glass article of embodiment (28) or (29) is provided wherein the alkali aluminosilicate glass has a coefficient of thermal expansion of at least about $90 \times 10^{-7}$ °C.$^{-1}$ and comprises: from about 57 mol % to about 75 mol % $SiO_2$; from about 6 mol % to about 17 mol % $Al_2O_3$; from about 2 mol % to about 7 mol % $P_2O_5$; from about 14 mol % to about 17 mol % $Na_2O$; and from greater than 1 mol % to about 5 mol % $K_2O$.

According to embodiment (34), the glass article of any of embodiments (28) to (33) is provided wherein the alkali aluminosilicate glass is fusion formable.

According to embodiment (35), the glass article of any of embodiments (28) to (34) is provided wherein the glass article forms at least a portion of a cover glass for a consumer electronic device, the consumer electronic device comprising a housing; electrical components provided at least partially internal to the housing, the electrical components including at least a controller, a memory, and a display, the display being provided at or adjacent to a front surface of the housing; wherein the cover glass is provided at or over the front surface of the housing and over the display.

According to embodiment (36), the glass article of any of embodiments (28) to (35) is provided wherein the glass article forms at least a portion of a pharmaceutical vial, an automotive glass panel, or an architectural glass panel.

These and other aspects, embodiments, advantages, and salient features will become apparent from the following detailed description, the accompanying drawings, and the appended claims.

DETAILED DESCRIPTION

Figure 1:
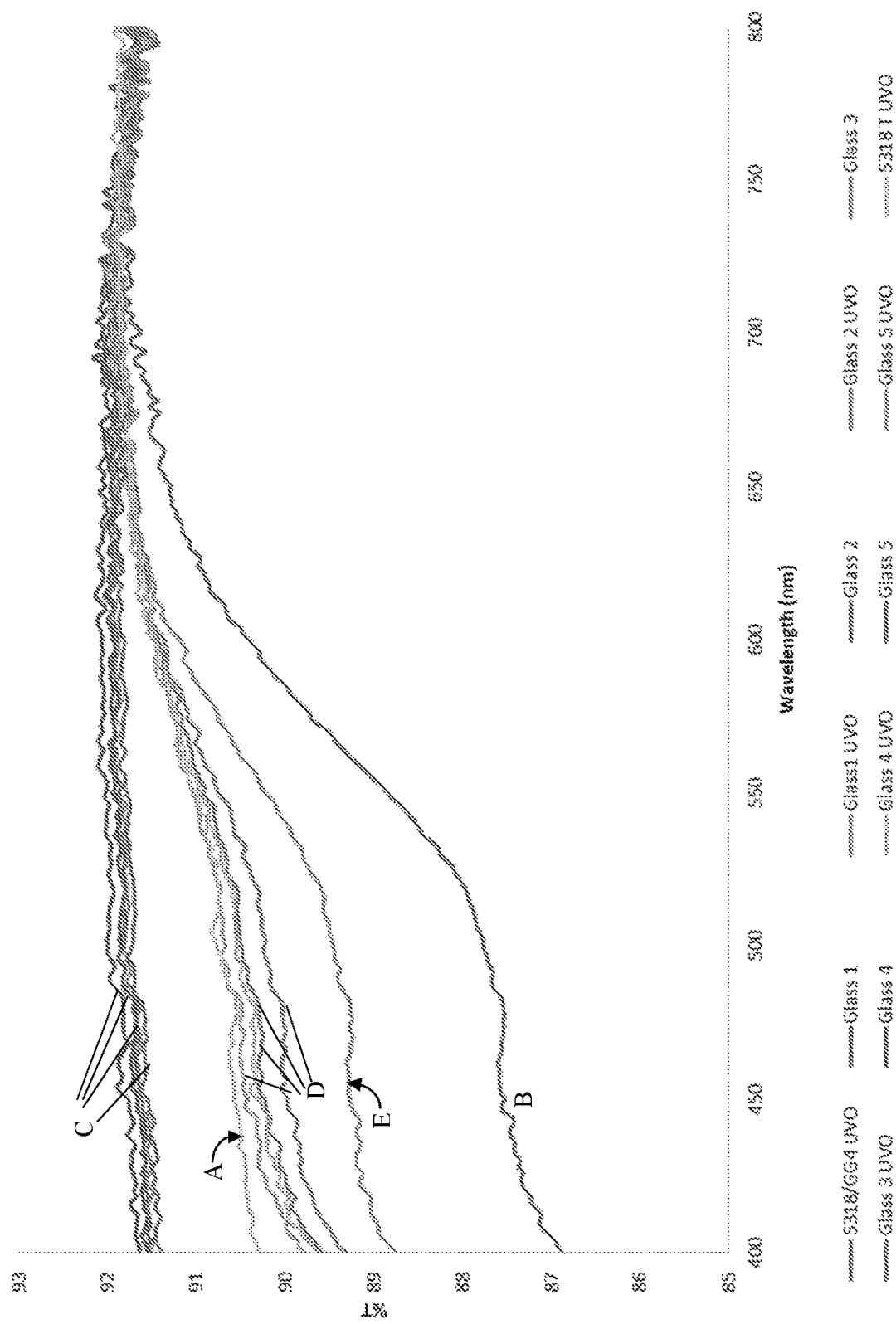
FIG. 1 is a plot of transmission spectra in the visible wavelength range of zirconia-containing glasses before and after exposure to a UV ozone plasma and reference glasses after exposure to the UV ozone plasma.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %).

As used herein, the color coordinates L*, a*, and b* refer to the L-a-b representation of the CIELAB color space in which L* refers to the lightness/darkness of a color, a* refers to the red/green components of a color, and b* refers to the blue/yellow components of a color. Absolute values of color coordinates a* (|a*|) and b* (|b*|) are described herein, unless otherwise specified.

As used herein, the terms "ultraviolet" and "UV" radiation or light refer to light having a wavelength of 370 nanometers (nm) or less.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free of oxides of titanium, iron, germanium, cerium, nickel, cobalt, and europium" is one in which such oxides are not actively added or batched into the glass, but may be present in very small amounts (e.g., 400 parts per million (ppm) or less; or 300 ppm or less) as a contaminant.

Compressive stress and depth of layer are measured using those means known in the art. Such means include, but are not limited to, measurement of surface stress (FSM) using commercially available instruments such as the FSM-6000, manufactured by Orihara Co., Ltd. (Tokyo, Japan). Surface stress measurements rely upon the accurate measurement of the stress optical coefficient (SOC), which is related to the birefringence of the glass. SOC in turn is measured according to a modified version (hereinafter "the modification") of Procedure C, which is described in ASTM standard C770-98 (2013), entitled "Standard Test Method for Measurement of Glass Stress-Optical Coefficient," the contents of which are incorporated herein by reference in their entirety. The modification of Procedure C includes using a glass disc as the specimen having a thickness of 5 to 10 mm and a diameter of 12.7 mm. The disc is isotropic and homogeneous, and is core-drilled with both faces polished and parallel. The modification also includes calculating the maximum force, Fmax to be applied to the disc. The force should be sufficient to produce at least 20 MPa compression stress. Fmax is calculated using the equation:

$$F\text{max} = 7.854 \cdot D \cdot h$$

where: Fmax is the maximum force, expressed in Newtons; D is the diameter of the disc, expressed in millimeters (mm); and h is the thickness of the light path, also expressed in mm. For each force applied, the stress (σ) is computed using the equation:

$$\sigma \text{ (MPa)} = 8F/(\pi \cdot D \cdot h)$$

where: F is the force, expressed in Newtons; D is the diameter of the disc, expressed in millimeters (mm); and h is the thickness of the light path, also expressed in millimeters.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are glass articles that are resistant to coloration when exposed to ultraviolet light or plasma cleaning processes. The glass articles comprise or consist of an alkali aluminosilicate glass containing from about 0.1 mol % to about 1 mol % of at least one of $ZrO_2$, $Sb_2O_3$, and $Nb_2O_5$ and less than about 400 ppm each of oxides of titanium, iron, germanium, cerium, nickel, cobalt, and europium. The alkali aluminosilicate glass has color coordinates L*≥96.10, |a*|≤0.60, and |b*|≤0.80 either before or after exposure to UV light or a plasma. In some embodiments, the alkali aluminosilicate glass has color coordinates L*≥96.70, |a*|≤0.03, and |b*|≤0.22 prior to exposure to either UV radiation or a plasma.

Zirconia ($ZrO_2$) reduces both pink and yellow coloration of the glass upon exposure to either UV radiation or plasma, and may be substituted for silica ($SiO_2$) in the glass. In addition, the presence of $ZrO_2$ improves the durability of the glass. In some embodiments, the glass article comprises an alkali aluminosilicate glass containing from about 0.1 mol % to about 1 mol % $ZrO_2$ (0.1 mol %≤$ZrO_2$≤1 mol %) or from about 0.1 mol % to about 0.6 mol % $ZrO_2$ (0.1 mol %≤$ZrO_2$≤0.6 mol %) and has color coordinates L*≥96.10, |a*|≤0.59, and |b*|≤0.77 either before or after exposure to UV light or a plasma. Prior to exposure to such radiation or plasma, these glasses have color coordinates L*≥96.71, |a*|≤0.01, and |b*|≤0.16.

In some embodiments, the glasses comprising $ZrO_2$ contain less than about 400 ppm each of $Sb_2O_3$ and $Nb_2O_5$.

In some embodiments, the glasses comprising $ZrO_2$ further comprise from about 0.5 mol % to about 2 mol % ZnO (0.5 mol %≤ZnO≤2 mol %), or from about 0.5 mol % to about 1 mol % ZnO (0.5 mol %≤ZnO≤1 mol %), and have color coordinates L*≥96.41, |a*|≤0.28, and |b*|≤0.52 either before or after exposure to UV light or a plasma. In some embodiments, these glasses have L*≥96.73, |a*|≤0.01, and |b*|≤0.16 prior to exposure to either UV light or a plasma. The amount of ZnO that may be added to the glass is limited by the amounts of alkaline earth metals that are present in the glass.

Compositions of non-limiting examples of glasses that are resistant to photo-darkening and comprising either $ZrO_2$ or $ZrO_2$ and ZnO, as determined by x-ray fluorescence, are listed in Table 1. Two reference glasses that do not contain $ZrO_2$ are also listed in Table 1. Reference glass 2 in Table 1 does not contain $ZrO_2$, but contains 1.11 mol % ZnO.

TABLE 1

Compositions of glasses that are resistant to photo-darkening and containing either $ZrO_2$ or $ZrO_2$ + ZnO, and reference glasses that do not contain $ZrO_2$.

|  | Glass 1 | Glass 2 | Glass 3 | Glass 4 | Glass 5 | Ref. 1 | Ref. 2 |
|---|---|---|---|---|---|---|---|
| $SiO_2$ | 58.42 | 58.40 | 58.29 | 58.92 | 59.16 | 59.21 | 59.78 |
| $Al_2O_3$ | 15.14 | 15.34 | 15.32 | 15.44 | 15.54 | 15.57 | 15.63 |
| $P_2O_5$ | 6.63 | 6.62 | 6.61 | 6.67 | 6.55 | 6.23 | 6.30 |
| $Na_2O$ | 16.37 | 16.26 | 16.36 | 16.54 | 16.39 | 15.52 | 15.89 |
| $K_2O$ | 2.26 | 2.19 | 2.22 | 2.28 | 2.22 | 2.24 | 2.26 |
| MgO | 1.05 | 1.07 | 1.07 | 0.01 | 0.01 | 1.09 | 0.01 |
| $SnO_2$ | 0.10 | 0.10 | 0.09 | 0.10 | 0.10 | 0.10 | 0.09 |
| ZnO | 0.00 | 0.00 | 0.00 | 1.13 | 1.10 | 0.00 | 1.11 |
| $ZrO_2$ | 0.28 | 0.57 | 0.84 | 0.29 | 0.58 | 0.00 | 0.00 |

The glasses listed in Table 1 were treated with UV ozone plasma for 16 minutes. Color coordinates L*, a*, and b* were calculated before and after exposure to the plasma, and are based on transmission measurements in the 380-780 nm wavelength range with a 10° observation angle. Color coordinates measured before and after exposure are listed in Table 2. As can be seen from the data in Table 2, the $ZrO_2$-containing and reference glasses have comparable color coordinates. However, the $ZrO_2$-containing glasses exhibit less discoloration as a result of exposure to the plasma. Those glasses that contained both $ZrO_2$ and ZnO (glasses 4 and 5) exhibited the least amount of discoloration.

TABLE 2

Color coordinates for the glasses listed in Table 1, obtained before and after exposure to UV ozone plasma for 16 minutes, in the 380-780 nm wavelength range. Color coordinates a* and b* are given as positive and negative values.

|  | Glass 1 | Glass 2 | Glass 3 | Glass 4 | Glass 5 | Ref. 1 | Ref. 2 |
|---|---|---|---|---|---|---|---|
| Before Exposure | | | | | | | |
| L* | 96.83 | 96.78 | 96.75 | 96.77 | 96.73 | 96.71 | 96.68 |
| a* | −0.01 | −0.01 | 0.00 | 0.00 | 0.00 | −0.04 | −0.03 |
| b* | 0.15 | 0.16 | 0.16 | 0.16 | 0.16 | 0.14 | 0.15 |
| After Exposure | | | | | | | |
| L* | 96.13 | 96.32 | 96.38 | 96.41 | 96.43 | 95.61 | 96.10 |
| a* | 0.59 | 0.35 | 0.26 | 0.28 | 0.20 | 0.97 | 0.43 |
| b* | 0.77 | 0.60 | 0.52 | 0.52 | 0.47 | 1.08 | 0.66 |

FIG. 1 is a plot of transmission spectra in the visible (380-780 nm) wavelength range obtained before and after exposure to a UV ozone plasma for 16 minutes for Glasses 1-5 and post-exposure for reference glasses 1 and 2. The spectra of zirconia-containing glasses of the present disclosure (glasses 1-5) obtained before exposure are represented by the grouping of spectra labeled "C" in FIG. 1. Each of these unexposed glasses has a transmission of at least about 91% in the visible region of the spectrum. Following exposure, each of the zirconia-containing glasses (represented by grouping D and line E in FIG. 1) has a transmission of at least about 88%. In contrast, the transmission of reference sample 2 (B in FIG. 1) is less than that of the zirconia-containing glasses throughout the entire visible range. Spectrum A in FIG. 1 was obtained post-exposure for a "photo-darkening enhanced" version of reference sample 1 that contains 0.24 wt % $TiO_2$. This "enhanced" version of reference sample 2 has a transmission of at least about 90% in the visible range of the spectrum.

In some embodiments, the glass articles described herein comprise an alkali aluminosilicate glass containing from about 0.1 mol % to about 1 mol % $Nb_2O_5$ and less than about 400 ppm each of $Sb_2O_3$ and $ZrO_2$ and having color coordinates L*≥96.65, |a*|≤0.07, and |b*|≤0.30 either before or after exposure to UV radiation or plasma. Thus, the presence of $Nb_2O_5$ adds yellow color to the glass. In some embodiments, these glasses have color coordinates L*≥96.80, |a*|≤0.03, and |b*|≤0.22 when not exposed to such radiation. Compositions, as determined by x-ray fluorescence, of non-limiting examples of photo-darkening resistant glasses comprising $Nb_2O_5$ are listed in Table 3.

TABLE 3

Compositions of glasses comprising $Nb_2O_5$ that are resistant to photo-darkening.

| mol % | Glass 6 | Glass 7 | Glass 8 | Glass 9 |
|---|---|---|---|---|
| $SiO_2$ | 58.60 | 58.80 | 59.23 | 58.65 |
| $Al_2O_3$ | 15.32 | 15.29 | 15.21 | 15.31 |
| $P_2O_5$ | 6.42 | 6.30 | 6.16 | 6.29 |
| $Na_2O$ | 16.04 | 15.89 | 15.60 | 15.81 |
| $K_2O$ | 2.37 | 2.37 | 2.36 | 2.41 |
| MgO | 1.01 | 1.01 | 0.99 | 0.98 |
| CaO | 0.03 | 0.03 | 0.03 | 0.03 |
| $SnO_2$ | 0.11 | 0.11 | 0.11 | 0.11 |
| $Nb_2O_5$ | 0.10 | 0.20 | 0.31 | 0.42 |

The glasses listed in Table 3 were treated with UV ozone plasma for 16 minutes. Color coordinates L*, a*, and b* were calculated before and after exposure to the plasma, and are based on transmission measurements in the 380-780 nm wavelength range with a 10° observation angle. Color coordinates measured before and after exposure are listed in Table 4.

TABLE 4

Color coordinates for the photo-darkening resistant glasses listed in Table 3, obtained before and after exposure to UV ozone plasma for 16 minutes, in the 380-780 nm wavelength range. Color coordinates a* and b* are given as positive and negative values.

| | Glass 6 | Glass 7 | Glass 8 | Glass 9 |
|---|---|---|---|---|
| | Before Exposure | | | |
| L* | 96.88 | 96.87 | 96.89 | 96.82 |
| a* | −0.02 | −0.02 | −0.03 | −0.03 |
| b* | 0.15 | 0.18 | 0.21 | 0.22 |
| | After Exposure | | | |
| L* | 96.68 | 96.72 | 96.77 | 96.73 |
| a* | 0.07 | 0.00 | −0.02 | −0.03 |
| b* | 0.28 | 0.20 | 0.19 | 0.19 |

When exposed to UV radiation, some photoelectrons will be excited forming electron color centers and/or hole centers. Phosphorus oxygen-hole centers are formed on the oxygen atoms surrounding phosphorus atoms with two non-bridging oxygens, and is an intrinsic defect. These color centers absorb light at wavelengths in the visible range that are of highest interest for cover glass applications. Electron paramagnetic resonance (EPR) data indicate that the phosphorus oxygen hole center population in reference glasses 1 and 2 (Table 1) significantly increases after exposure to oxygen plasma. As a result, these glasses absorb at 540 nm (green), 430 nm (blue), and 300 nm (UV) and are reddish in color.

Multivalent ions such as Ti, Fe, Mn, Ge, Sn, Ce, Ni, Co, Eu, and the like are typically added to the glass to block UV wavelengths and thus reduce photo-darkening. However, the addition of these multivalent ions adds color to the glass without or prior to exposure to UV radiation or plasma.

Figure 2:
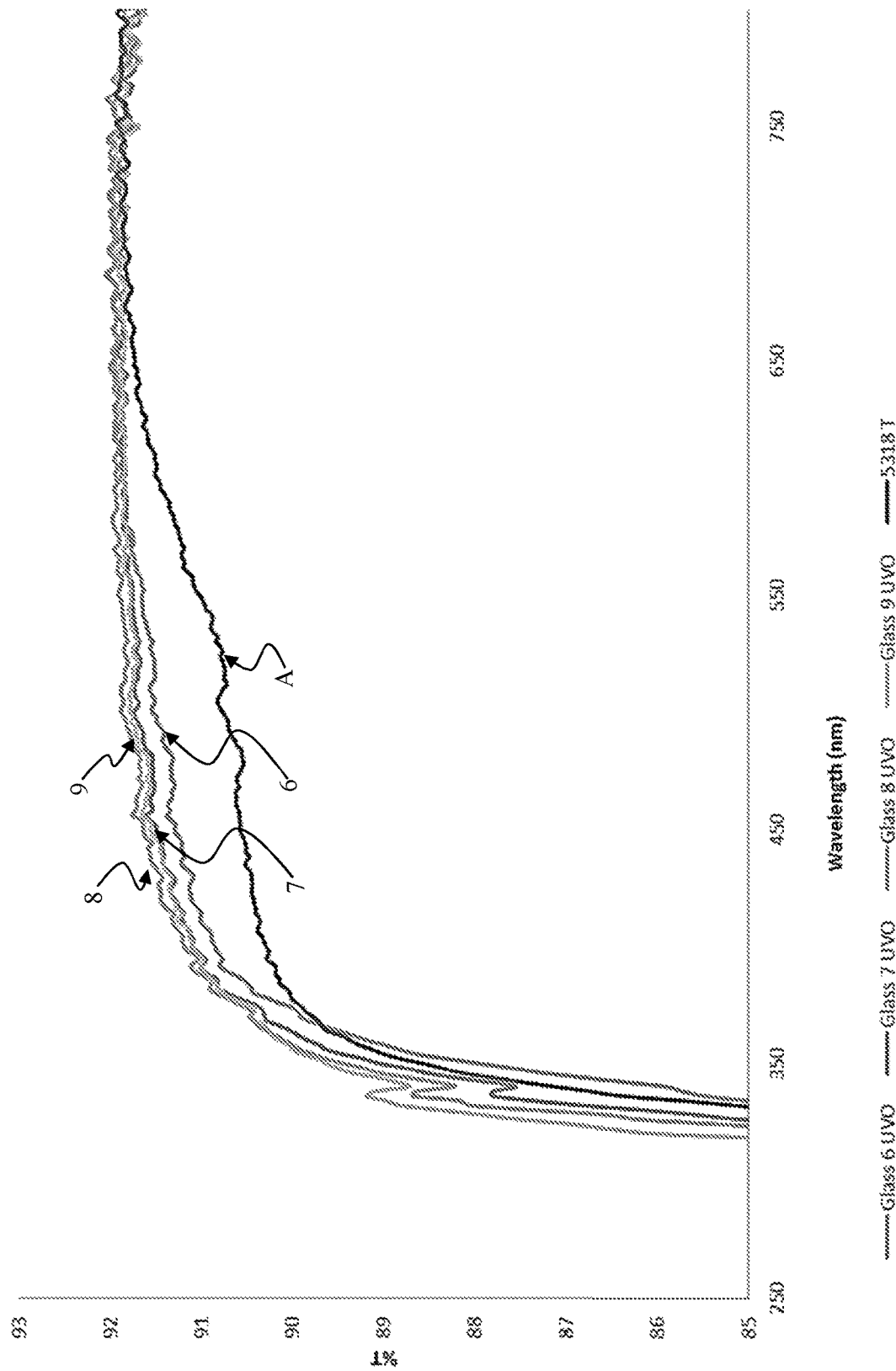
FIG. 2 is a plot of transmission spectra in the visible wavelength range of $Nb_2O_5$-containing glasses and a reference glass after exposure to a UV ozone plasma.

FIG. 2 is a plot of transmission spectra in the visible (380-780 nm) wavelength range obtained after exposure to a UV ozone plasma for 16 minutes for $Nb_2O_5$-containing glasses 6-9 and the "photo-darkening enhanced" version of reference glass 1 (A in FIGS. 1 and 2). The $Nb_2O_5$-containing glasses exhibit higher transmission and reduced absorption after plasma treatment and eliminate the oxygen hole center absorption.

In other embodiments, the photo-darkening resistant glass articles described herein comprise an alkali aluminosilicate glass comprising from about 0.1 mol % to about 1 mol % $Sb_2O_3$ and less than about 400 ppm each of $ZrO_2$ and $Nb_2O_5$.

The alkali aluminosilicate glasses described herein comprise: at least about 50 mol % $SiO_2$; from about 9 mol % to about 22 mol % $Al_2O_3$; at least one of $B_2O_3$ and $P_2O_5$, wherein 0.1 mol %≤$B_2O_3$(mol %)+$P_2O_5$(mol %)≤19 mol %; and from about 8 mol % to about 16 mol % $Na_2O$.

In some embodiments, the alkali aluminosilicate glass comprises at least 50 mol % $SiO_2$, less than 10 mol % $B_2O_3$, and at least 8 mol % $Na_2O$, wherein the alkali aluminosilicate glass is free of lithium and ion exchangeable, wherein [($Al_2O_3$(mol %)+$B_2O_3$(mol %))/(Σalkali metal oxide modifiers (mol %))]>1, wherein $Al_2O_3$(mol %)>$B_2O_3$(mol %) and the modifiers are $Na_2O$ and, optionally, at least one or more alkali metal oxide ($R_2O$) other than $Na_2O$ and $Li_2O$ and one or more alkaline earth oxide (RO), wherein the aluminoborosilicate glass has a Young's modulus of less than about 69 GPa, and wherein −5.7 mol %≤Σalkali metal oxide modifiers−$Al_2O_3$<2.99 mol %. In one embodiment, the alkali aluminosilicate glass comprises at least 50 mol % $SiO_2$ and at least one modifier selected from the group consisting of alkali metal oxides and alkaline earth metal oxides, wherein [($Al_2O_3$(mol %)+$B_2O_3$(mol %))/(Σalkali metal oxide modifiers (mol %))]>1. In some embodiments, the glass comprises at least 50 mol % $SiO_2$, less than 10 mol % $B_2O_3$, and at least 8 mol % $Na_2O$, wherein the aluminoborosilicate glass is free of lithium and ion exchangeable, wherein [($Al_2O_3$(mol %)+$B_2O_3$(mol %))/(Σalkali metal oxide modifiers (mol %))]>1, wherein $Al_2O_3$(mol %)>$B_2O_3$ (mol %) and the modifiers are $Na_2O$ and, optionally, at least one of one or more alkali metal oxide ($R_2O$) other than $Na_2O$ and $Li_2O$ and one or more alkaline earth oxide (RO), wherein the aluminoborosilicate glass has a Young's modulus of less than about 69 GPa, and wherein −5.7 mol %<Σalkali metal oxide modifiers−$Al_2O_3$<2.99 mol %. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. In some embodiments, the glass comprises or consists essentially of: at least 58 mol % $SiO_2$; at least 8 mol % $Na_2O$; from 5.5 mol % to 12 mol % $B_2O_3$; and $Al_2O_3$, wherein [($Al_2O_3$(mol %)+$B_2O_3$(mol %))/(Y alkali metal oxide modifiers (mol %))]>1, $Al_2O_3$(mol %)>$B_2O_3$(mol %), and 0.9<$R_2O$/$Al_2O_3$<1.3, wherein the glass is substantially free of $Li_2O$. The glass is described in U.S. Pat. No. 8,586,492, entitled "Crack And Scratch Resistant Glass and Enclosures Made Therefrom," filed Aug. 18, 2010, by Kristen L. Barefoot et al., and U.S. Pat. No. 9,290,407, entitled "Crack And Scratch Resistant Glass and Enclosures Made Therefrom," filed Nov. 18, 2013, by Kristen L. Barefoot et al., both claiming priority to U.S. Provisional Patent Application No. 61/235,767, filed on Aug. 21, 2009. The contents of the above patents and patent application are incorporated herein by reference in their entirety.

In some embodiments, the alkali aluminosilicate glass comprises: at least about 50 mol % $SiO_2$; at least about 10 mol % alkali metal oxides ($R_2O$), wherein $R_2O$ comprises at least $Na_2O$; $Al_2O_3$, wherein $-0.5$ mol % $Al_2O_3$(mol %)$-R_2O$ (mol %)$\leq 2$ mol %; and $B_2O_3$, wherein $B_2O_3$(mol %)$-(R_2O$ (mol %)$-Al_2O_3$(mol %))$\geq 4.5$ mol %. In certain embodiments, the glass comprises: at least about 50 mol % $SiO_2$; at least about 10 mol % $R_2O$, wherein $R_2O$ comprises at least about 10 mol % $Na_2O$; from 12 mol % to about 22 mol % $Al_2O_3$, wherein $-1.6$ mol %$\leq Al_2O_3$(mol %)$-R_2O$(mol %)$\leq 2$ mol %; from greater than 0 mol % to 5 mol % $B_2O_3$, wherein $B_2O_3$(mol %)$-(R_2O$(mol %)$-Al_2O_3$(mol %))$\geq 4.5$ mol %; and, optionally, at least 0.1 mol % of at least one of MgO and ZnO. In other embodiments, the glass has a zircon breakdown temperature that is equal to the temperature at which the glass has a viscosity of greater than about 40 kPoise and comprises: at least about 50 mol % $SiO_2$; at least about 10 mol % alkali metal oxides ($R_2O$), wherein $R_2O$ comprises $Na_2O$; $Al_2O_3$; and $B_2O_3$, wherein $B_2O_3$(mol %)$-(R_2O$(mol %)$-Al_2O_3$(mol %))$\geq 4.5$ mol %. In still other embodiments, the glass is ion exchanged, has a Vickers crack initiation threshold of at least about 30 kgf, and comprises: at least about 50 mol % $SiO_2$; at least about 10 mol % $R_2O$, wherein $R_2O$ comprises $Na_2O$; $Al_2O_3$, wherein $-0.5$ mol % $Al_2O_3$ (mol %)$-R_2O$(mol %)$\leq 2$ mol %; and $B_2O_3$, wherein $B_2O_3$ (mol %)$-(R_2O$(mol %)$-Al_2O_3$(mol %))$\geq 4.5$ mol %. Such glasses are described in U.S. patent application Ser. No. 13/903,398, by Matthew J. Dejneka et al., entitled "Ion Exchangeable Glass with High Damage Resistance," filed May 28, 2013, claiming priority from U.S. Provisional Patent Application No. 61/653,485, filed May 31, 2012. The contents of these patent applications are incorporated herein by reference in their entirety.

In one embodiment, the alkali aluminosilicate glass comprises $SiO_2$, $Al_2O_3$, $P_2O_5$, and at least one alkali metal oxide ($R_2O$), wherein $0.75 \leq [(P_2O_5(\text{mol \%}) + R_2O(\text{mol \%}))/M_2O_3$ (mol %)]$\leq 1.2$, where $M_2O_3 = Al_2O_3 + B_2O_3$. In some embodiments, the alkali aluminosilicate glass comprises $SiO_2$, from 16 mol % to about 28 mol % $Al_2O_3$, $P_2O_5$, and at least one alkali metal oxide ($R_2O$) selected from the group consisting of $Na_2O$ and $K_2O$, wherein $0.75 \leq [(P_2O_5(\text{mol \%}) + R_2O(\text{mol \%}))/M_2O_3$ (mol %)]$\leq 1.3$, where $M_2O_3 = Al_2O_3 + B_2O_3$. In some embodiments, the alkali aluminosilicate glass comprises or consists essentially of: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$. In certain embodiments, the alkali aluminosilicate glass comprises: from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 10 to about 16 mol % $R_2O$, or from about 12 mol % to about 16 mol % $R_2O$, where $R_2O$ includes $Na_2O$. In some embodiments, 11 mol %$\leq M_2O_3 \leq 30$ mol %. In some embodiments, 13 mol %$\leq R_xO \leq 30$ mol %, where $R_xO$ is the sum of alkali metal oxides, alkaline earth metal oxides, and transition metal monoxides present in the glass. In some embodiments, the glass is lithium-free. In other embodiments, the glass may comprise up to about 10 mol % $Li_2O$, or up to about 7 mol % $Li_2O$. These glasses are described in U.S. Pat. No. 9,346,703, entitled "Ion Exchangeable Glass with Deep Compressive Layer and High Damage Threshold," filed Nov. 28, 2011, by Dana Craig Bookbinder et al. and claiming priority from U.S. Provisional Patent Application No. 61/417,941, filed on Nov. 30, 2010, and having the same title, the contents of which are incorporated herein by reference in their entirety.

In certain embodiments, the alkali aluminosilicate glass comprises at least about 2 mol % $P_2O_5$, or at least about 4 mol % $P_2O_5$, wherein $(M_2O_3(\text{mol \%})/R_xO(\text{mol \%})) < 1$, wherein $M_2O_3 = Al_2O_3 + B_2O_3$, and wherein $R_xO$ is the sum of monovalent and divalent cation oxides present in the alkali aluminosilicate glass. In some embodiments, the alkali aluminosilicate glass comprises at least about 2 mol % $P_2O_5$, or at least about 4 mol % $P_2O_5$, wherein $1.3 < [(P_2O_5(\text{mol \%}) + R_2O(\text{mol \%}))/M_2O_3$ (mol %)]$\leq 2.3$, where $M_2O_3 = Al_2O_3 + B_2O_3$, and $R_2O$ is the sum of monovalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass is lithium-free and comprises or consists essentially of from about 40 mol % to about 70 mol % $SiO_2$; from about 11 mol % to about 25 mol % $Al_2O_3$; from about 2 mol % $P_2O_5$, or from about 4 mol % to about 15 mol % $P_2O_5$; from about 10 mol % $Na_2O$, or from about 13 mol % to about 25 mol % $Na_2O$; from about 13 to about 30 mol % $R_xO$, where $R_xO$ is the sum of the alkali metal oxides, alkaline earth metal oxides, and transition metal monoxides present in the glass; from about 11 mol % to about 30 mol % $M_2O_3$, where $M_2O_3 = Al_2O_3 + B_2O_3$; from 0 mol % to about 1 mol % $K_2O$; and from 0 mol % to about 4 mol % $B_2O_3$; wherein $1.3 < [(P_2O_5(\text{mol \%}) + R_2O(\text{mol \%}))/M_2O_3$ (mol %)]$\leq 2.3$, where $R_2O$ is the sum of monovalent cation oxides present in the glass. In some embodiments, the glass is lithium-free and, in other embodiments, comprise up to about 10 mol % $Li_2O$, or up to about 7 mol % $Li_2O$. The glass is described in U.S. Pat. No. 9,156,724 by Timothy M. Gross, entitled "Ion Exchangeable Glass with High Crack Initiation Threshold," filed Nov. 15, 2012, and U.S. Pat. No. 8,765,262 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. The contents of the above patent and applications are incorporated herein by reference in their entirety.

In some embodiments, the alkali aluminosilicate glass comprises $SiO_2$, $Al_2O_3$, $P_2O_5$, and greater than about 1 mol % $K_2O$, wherein the glass has a coefficient of thermal expansion of at least about $90 \times 10^{-7}$° C. In some embodiments, the alkali aluminosilicate glass comprises: from about 57 mol % to about 75 mol % $SiO_2$; from about 6 mol % to about 17 mol % $Al_2O_3$; from about 2 mol % to about 7 mol % $P_2O_5$; from about 14 mol % to about 17 mol % $Na_2O$; and from greater than about 1 mol % to about 5 mol % $K_2O$. The glass is described in U.S. patent application Ser. No. 14/465,888 by Timothy M. Gross and Xiaoju Guo, entitled "Damage Resistant Glass with High Coefficient of Thermal Expansion," filed on Aug. 22, 2014, which claims priority to U.S. Provisional Patent Application No. 61/870,301, filed on Aug. 27, 2013. The contents of the above patent applications are incorporated herein by reference in their entirety.

In some embodiments, the glasses described herein are substantially free of at least one of arsenic, antimony, barium, strontium, bismuth, lithium, and their compounds. In other embodiments, the glasses may include up to about 5 mol % $Li_2O$.

The glasses described herein may, in some embodiments, be down-drawable by processes known in the art, such as slot-drawing, fusion drawing, re-drawing, and the like, and have a liquidus viscosity of at least 130 kiloPoise. In addition to those compositions listed hereinabove, various other ion exchangeable alkali aluminosilicate glass compositions may be used.

In some embodiments, the glass articles described herein are chemically strengthened by those ion exchange methods known in the art.

In the ion exchange process, ions in the surface layer of the glass are replaced by—or exchanged with—larger ions having the same valence or oxidation state to achieve a layer under a compressive stress (CS) extending from the surface, where CS is the maximum, of the glass to a depth of compression (DOC) within the glass phase. In those embodiments in which the glass article comprises, consists essentially of, or consists of an alkali aluminosilicate glass, both the ions in the surface layer of the glass and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$ or the like.

Ion exchange processes are typically carried out by immersing a glass article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass that result from the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

Figure 3:
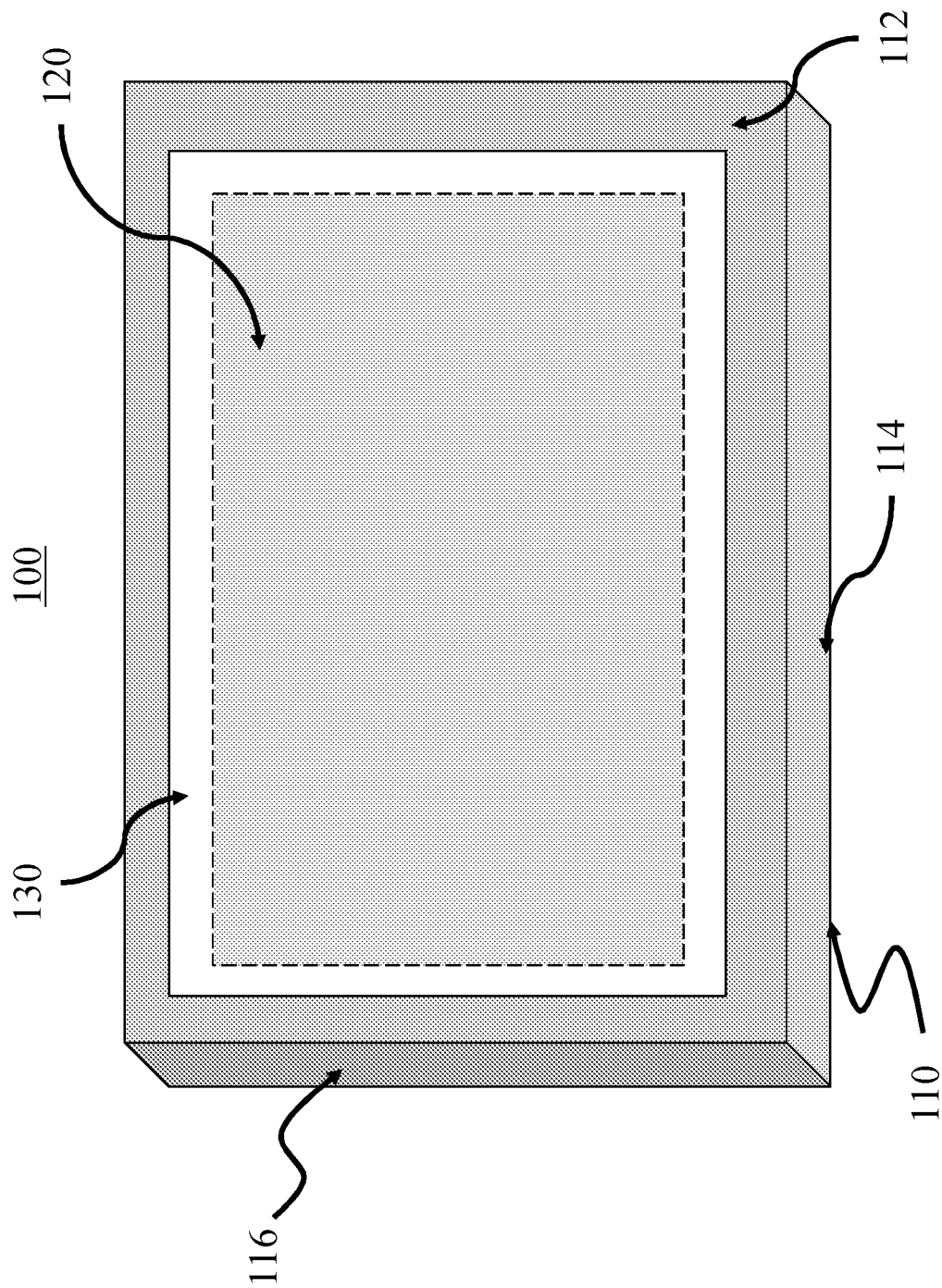
FIG. 3 is a schematic view of a consumer electronic product.

In some embodiments, the glass articles and ion-exchanged glass articles described herein form a portion of a consumer electronic product, such as a cellular phone or smart phone, laptop computer, tablet, or the like. A schematic view of a consumer electronic product (e.g., a smart phone) is shown in FIG. 3. Consumer electronic product 100 typically comprises a housing 110 having a front surface 112, a back surface 114, and side surfaces 116; and includes electrical components (not shown), which are at least partially internal to the housing 110. The electrical components include at least a power source, a controller, a memory, and a display 120. The display 120 is, in some embodiments, provided at or adjacent the front surface 112 of the housing. A cover glass 130, which comprises the ion-exchanged glass described herein, is provided at or over the front surface 112 of the housing 100 such that the cover glass 130 is positioned over the display 120 and protects the display 120 from damage caused by impact or damage. In some embodiments, the display 120 and/or cover glass 130 are bendable.

In other embodiments, the glass articles and ion-exchanged glass articles described herein are used in pharmaceutical applications, such as vials and the like. In still other embodiments, the glass articles and ion exchanged glass articles are used in architectural and automotive applications such as, but not limited to, glazing and structural panels.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass article comprising an alkali aluminosilicate glass, the alkali aluminosilicate glass comprising:
   at least 50 mol % $SiO_2$;
   from 9 mol % to 22 mol % $Al_2O_3$;
   at least 2 mol % $P_2O_5$, wherein 2 mol %≤$B_2O_3$(mol %)+$P_2O_5$(mol %)≤19 mol %;
   from 8 mol % to 16 mol % $Na_2O$;
   from 0.1 mol % to 1 mol % of at least one of $ZrO_2$, $Sb_2O_3$, and $Nb_2O_5$; and
   less than 400 ppm each of oxides of titanium, iron, germanium, cerium, nickel, cobalt, and europium, and wherein the alkali aluminosilicate glass has color coordinates L*≥96.10, |a*|≤0.60, and |b*|≤0.80.

2. The glass article of claim 1, wherein the alkali aluminosilicate glass has color coordinates L*≥96.70, |a*|≤0.03, and |b*|≤0.22.

3. The glass article of claim 1, wherein the alkali aluminosilicate glass comprises at least 4 mol % $P_2O_5$, wherein 1.3<[($P_2O_5$+$R_2O$)/$M_2O_3$]≤2.3, wherein $M_2O_3$=$Al_2O_3$+$B_2O_3$, and wherein $R_2O$ is the sum of monovalent cation oxides present in the alkali aluminosilicate glass.

4. The glass article of claim 1, wherein the alkali aluminosilicate glass comprises:
   at least 50 mol % $SiO_2$;
   from 16 mol % to 28 mol % $Al_2O_3$;
   at least 4 mol % $P_2O_5$; and
   at least one alkali metal oxide ($R_2O$) selected from the group consisting of $Na_2O$ and $K_2O$, wherein 0.75≤[($P_2O_5$(mol %)+$R_2O$(mol %))/$M_2O_3$ (mol %)]≤1.3, where $M_2O_3$=$Al_2O_3$+$B_2O_3$.

5. The glass article of claim 1, wherein the alkali aluminosilicate glass comprises:
   at least 50 mol % $SiO_2$;
   at least 10 mol % $R_2O$, wherein $R_2O$ comprises at least 10 mol % $Na_2O$;
   from 12 mol % to 22 mol % $Al_2O_3$, wherein −1.6 mol %≤$Al_2O_3$(mol %)−$R_2O$(mol %)≤2 mol %; and
   from greater than 0 mol % to 5 mol % $B_2O_3$, wherein $B_2O_3$(mol %)−($R_2O$(mol %)−$Al_2O_3$(mol %))≥4.5 mol %.

6. The glass article of claim 1, wherein the alkali aluminosilicate glass has a coefficient of thermal expansion of at least $90 \times 10^{-7}$ °$C.^{-1}$ and comprises:
   from 57 mol % to 75 mol % $SiO_2$;
   from 6 mol % to 17 mol % $Al_2O_3$;
   from 2 mol % to 7 mol % $P_2O_5$;
   from 14 mol % to 17 mol % $Na_2O$; and
   from greater than 1 mol % to 5 mol % $K_2O$.

7. The glass article of claim 1, wherein the alkali aluminosilicate glass is fusion formable.

8. The glass article of claim 1, wherein the glass article forms at least a portion of a cover glass for a consumer electronic device, the consumer electronic device comprising a housing; electrical components provided at least partially internal to the housing, the electrical components including at least a controller, a memory, and a display, the display being provided at or adjacent to a front surface of the housing; wherein the cover glass is provided at or over the front surface of the housing and over the display.

9. The glass article of claim 1, wherein the glass article forms at least a portion of a pharmaceutical vial, an automotive glass panel, or an architectural glass panel.

10. The glass article of claim 1, wherein the alkali aluminosilicate glass comprises from 0.1 mol % to 1 mol % $ZrO_2$ and less than 400 ppm each of $Sb_2O_3$, and $Nb_2O_5$ and has color coordinates $L^*\geq96.10$, $|a^*|\leq0.59$, and $|b^*|\leq0.77$.

11. The glass article of claim 10, wherein the alkali aluminosilicate glass has color coordinates $L^*\geq96.71$, $|a^*|\leq0.01$, and $|b^*|\leq0.16$.

12. The glass article of claim 10, wherein the alkali aluminosilicate glass further comprises from 0.5 mol % to 2 mol % ZnO and has color coordinates $L^*\geq96.41$, $|a^*|\leq0.28$, and $|b^*|\leq0.52$.

13. The glass article of claim 12, wherein the alkali aluminosilicate glass has color coordinates $L^*\geq96.73$, $|a^*|\leq0.01$, and $|b^*|\leq0.16$.

14. The glass article of claim 1, wherein the alkali aluminosilicate glass comprises from 0.1 mol % to 1 mol % $Nb_2O_5$ and less than 400 ppm each of $Sb_2O_3$ and $ZrO_2$ and has color coordinates $L^*\geq96.65$, $|a^*|\leq0.07$, and $|b^*|\leq0.30$.

15. The glass article of claim 14, wherein the alkali aluminosilicate glass has color coordinates $L^*\geq96.80$, $|a^*|\leq0.03$, and $|b^*|\leq0.22$.

16. The glass article of claim 1, wherein the alkali aluminosilicate glass comprises from 0.1 mol % to 1 mol % $Sb_2O_3$ and less than 400 ppm each of, $ZrO_2$ and $Nb_2O_5$.

* * * * *

UNITED STATES PATENT AND TRADEMARK OFFICE
CERTIFICATE OF CORRECTION

PATENT NO. : 11,407,675 B2
APPLICATION NO. : 16/320277
DATED : August 9, 2022
INVENTOR(S) : Timothy Michael Gross et al.

It is certified that error appears in the above-identified patent and that said Letters Patent is hereby corrected as shown below:

On the Title Page

On the page 2, in Column 1, item (56) under "Other Publications", Line 2, delete "Aurthority;" and insert -- Authority; --.

In the Claims

In Column 14, Line 40, in Claim 4, delete "$M_2O_3$ (mol %)]" and insert -- $M_2O_3$(mol %)] --.

Signed and Sealed this
Eleventh Day of October, 2022

*Katherine Kelly Vidal*

Katherine Kelly Vidal
*Director of the United States Patent and Trademark Office*